(12) United States Patent
Goetz et al.

(10) Patent No.: US 7,845,175 B2
(45) Date of Patent: Dec. 7, 2010

(54) HEAT SHIELD FOR MOUNTING ON A HEAT-RADIATING OBJECT, PARTICULARLY ON A ROCKET ENGINE

(75) Inventors: Andreas Goetz, Munich (DE); Gerhard Hartmann, Amerang (DE); Herbert Linner, Germering (DE); Thomas Mattstedt, Munich (DE); Stefan Menne, Kolbermoor (DE)

(73) Assignee: Astrium GmbH, Munich (DE)

( * ) Notice: Subject to any disclaimer, the term of this patent is extended or adjusted under 35 U.S.C. 154(b) by 902 days.

(21) Appl. No.: 11/642,857

(22) Filed: Dec. 21, 2006

(65) Prior Publication Data

US 2007/0146972 A1 Jun. 28, 2007

(30) Foreign Application Priority Data

Dec. 22, 2005 (DE) ............... 10 2005 062 030

(51) Int. Cl.
*F02K 1/00* (2006.01)
(52) U.S. Cl. ........................................... 60/770
(58) Field of Classification Search ............... 60/200.1, 60/761, 766, 770, 752–760, 740, 742, 746, 60/747
See application file for complete search history.

(56) References Cited

U.S. PATENT DOCUMENTS

| 4,602,480 A | * | 7/1986 | Hill et al. ................. 60/253 |
| 4,649,701 A | | 3/1987 | Wendel |
| 5,220,786 A | * | 6/1993 | Campbell ................. 60/800 |
| 2002/0178734 A1 | * | 12/2002 | Stastny ..................... 60/796 |
| 2003/0213250 A1 | * | 11/2003 | Pacheco-Tougas et al. .... 60/752 |
| 2004/0228976 A1 | * | 11/2004 | Skoog et al. ............. 427/421.1 |
| 2005/0178126 A1 | * | 8/2005 | Young et al. ............... 60/747 |

* cited by examiner

*Primary Examiner*—Michael Cuff
*Assistant Examiner*—Andrew Nguyen
(74) *Attorney, Agent, or Firm*—Crowell & Moring LLP (57) ABSTRACT

A heat shield for mounting on a heat-radiating object, particularly on a rocket engine comprises a first planar element having a front side and a back side. In its mounted state, the first planar element extending from the heat-radiating object toward the outside, with its front side being exposed to the heat radiation at least of a section of the heat-radiating object. A second insulating element having a front side and a back side is arranged on the back side of the first planar element in such a manner that a gap is formed between the back side of the first planar element and the front side of the second element. In the mounted state of the heat shield, the gap widens in the direction from the heat-radiating object toward the outside.

21 Claims, 5 Drawing Sheets

HEAT SHIELD FOR MOUNTING ON A HEAT-RADIATING OBJECT, PARTICULARLY ON A ROCKET ENGINE

BACKGROUND AND SUMMARY OF THE INVENTION

This application claims the priority of German patent document 10 2005 062 030.2-13, filed Dec. 22, 2005, the disclosure of which is expressly incorporated by reference herein.

The invention relates to a heat shield for mounting on a heat-radiating object, particularly on a rocket engine.

To protect rocket engines from heating up as a result of intensive heat radiation of the engine nozzles, it is known to arrange heat shields between the thrust chamber of the engine and the nozzle expansion. A heat shield according to the state of the art consists of a dish-shaped metal plate whose shape essentially represents a cut-off flat cone. The metal plate therefore forms a conical ring which is mounted between the nozzle expansion and the remaining engine. The metal plate partially deflects the thermal radiation of the hot nozzle by reflection on its front side. This solution has the disadvantage that only a limited fraction of the heat flow can be reflected directly by emissivity of the metal surface of the heat shield. The remaining heat flow is emitted by the back side of the metal plate toward the remaining engine, and heats the latter to an extent that exceeds the demanded low temperatures of newly developed engines.

It is therefore an object of the invention to create a heat shield for mounting on a heat-radiating object, which ensures a still more effective heat shielding of the radiative heat flow generated by the heat-radiating object.

This and other objects and advantages are achieved by the heat shield according to the invention, which comprises a first planar element having a front side and a back side. In the mounted condition of the heat shield on the heat-radiating object, the first planar element extends from the heat-radiating object toward the outside, and its front side is exposed to the heat radiation at least of a section of the heat-radiating object. Furthermore, a second insulating planar element having a front side and a back side is provided in the heat shield according to the invention, arranged on the back side of the first planar element, such that a gap is formed between the back side of the first planar element and the front side of the second planar element. In the mounted condition of the heat shield, the gap widens in the direction from the heat-radiating object toward the outside.

By using a second insulating planar element and an expanding gap, a clearly enhanced reduction of the back-side surface temperature of the heat shield is achieved in comparison to known heat shields. In particular, the heat radiation emitted by the first planar element by way of its back side is, for the most part, radiated to the outside by reflections in the expanding gap in the direction away from the heat-conducting object. The still remaining heat radiation is insulated by the additional second insulating layer, so that only a very small fraction of the heat generated by the heat-radiating object reaches the back side of the heat shield.

In a preferred embodiment of the heat shield according to the invention, the first planar element comprises, at least in part, a metallic material. Metallic materials have a low emissivity, so that a large portion of the heat radiation is already reflected by the front of the first planar element, without arriving in the gap. As a result, a particularly good heat shield is obtained. To reduce the emissivity further, the front and/or back side of the first planar element preferably has a chemically inert coating. This coating, such as for example, gold, particularly an electroplated gold coating.

Particularly when the heat shield is used in a rocket engine, an essentially ring-shaped disk is used as a first planar element, which is arranged, for example, around the cylindrical engine body of the rocket engine and extends from the body essentially perpendicularly to the outside.

In a preferred further embodiment of the invention, the second planar element is insulated by an insulation material, particularly an insulating mat, arranged between the front and the back of the second planar element.

In order to achieve particularly a low emissivity of the front of the second planar element, both the front and, as required, also the back, of the second planar element is made at least partially of a metallic material. As a result, a very good dissipation of the radiative heat flow within the gap toward the outside away from the heat-radiating object is achieved.

Analogous to the first planar element, the front and/or back side of the second planar element preferably has a chemically inert coating, which may also be gold, particularly an electroplated gold coating.

According to a feature of the invention, the second planar element essentially may form a ring-shaped section of a cone. Such a shape of the second planar element is advantageous for its production because metal sheets, which can be unrolled, can be used for the front and back side of the planar element during its manufacturing.

In another embodiment of the invention, the gap between the back of the first planar element and the front of the second planar element has an essentially V-shaped cross-section, the point of the V-shape being situated adjacent to the heat-radiating object and adjoining the latter. This configuration effectively prevents heat radiation from exiting the gap in the direction of the heat-radiating object, and ensures a better heat shield.

In another embodiment of the heat shield according to the invention, the gap between the back of the first planar element and the front of the second planar element in the mounted condition of the heat shield is opened at its end situated away from the heat-radiating object, thereby achieving a very good removal of the heat radiation within the gap away from the heat-radiating object.

In a further embodiment of the invention, one or more holding elements are arranged between the back of the first planar element and the front of the second planar element. These holding elements ensure a secure connection between the partially very thin first planar element and the second planar element.

Preferably the holding elements are fastened to the first and/or second planar element, permitting a thermal expansion of the first and/or second planar element. Because of the considerable expansion of the materials due to the effect of heat, deformations caused by thermal expansion occur at the fastening of the holding elements are prevented. The holding elements are preferably strip-type, particularly sheet metal strips. The weight of the overall construction is thereby reduced.

In a further embodiment of the invention, the heat shield comprises a flange element to which the first and second planar elements are fastened, and which is used for mounting the heat shield on the heat-radiating object. This flange element preferably has an essentially ring-shaped construction, and the first and second planar elements are fastened to the flange element by means of screwed and/or welded and/or riveted connections. In this case, the flange element preferably has a plurality of recesses which separate contact surfaces of the flange element from one another; in the mounted condition of the heat shield, the contact surfaces rest against the heat-radiating object. By the providing of recesses, the contact surface of the flange element is reduced in the direction of the heat-radiating object, whereby an undesirable heat transfer toward the heat-radiating object is avoided. In addition, the recesses in the flange element can be used for the leading-through of electric cables.

For a particularly simple and effective fastening of the heat shield, the latter comprises a plurality of ring-shaped segments of a circle (particularly 120° segments), which can be mutually connected to form a closed ring during mounting on the heat-radiating object.

In another embodiment of the invention, another planar element is arranged on the back of the second planar element in such a manner that another gap, particularly in a V-shape, is formed between the back of the second planar element and the additional planar element. The temperature of the back of the second planar element can be reduced again by removal of heat radiation via the gap.

In addition to the above-described heat shield, the invention also relates to a rocket engine, comprising a thrust chamber for the propellant combustion and a nozzle expansion for the exiting of propellant. The heat shield according to the invention is arranged between the thrust chamber and nozzle expansion such that the front of the first planar element adjoins the nozzle expansion. In this manner, heat radiation from the intensively heating-up nozzle expansion in a rocket engine can be effectively prevented from reaches the thrust chamber which is to be protected from heat.

Other objects, advantages and novel features of the present invention will become apparent from the following detailed description of the invention when considered in conjunction with the accompanying drawings.

DETAILED DESCRIPTION OF THE DRAWINGS

Figure 1:
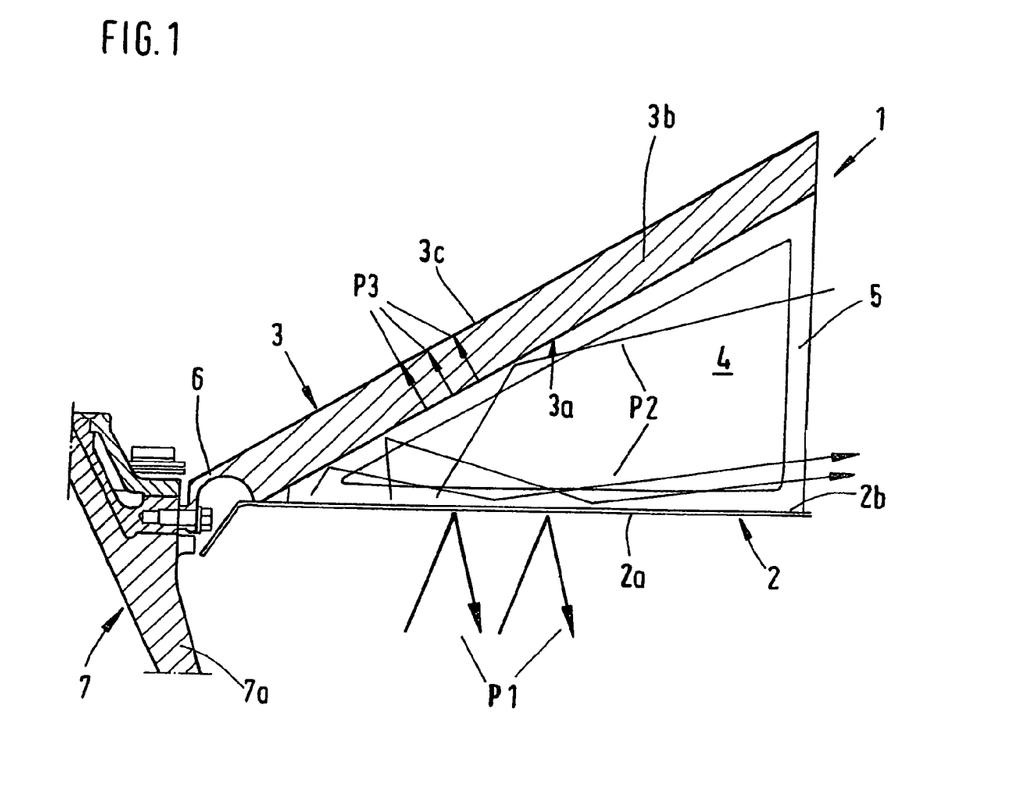
FIG. 1 is a cross-sectional view of a schematic representation of the heat shield according to the invention.

FIG. 1 is a schematic cross-sectional view for explaining the principle of operation of the heat shield according to the invention. The heat shield 1 according to the invention 1 comprises a first planar element 2 in the form of a deflection disk as well as a second element 3, which is arranged above the first planar element 2 and is referred to herein as an "insulation box". The insulation box rests at one end on the deflection disk 2 and is inclined with respect to this disk, so that a V-shaped space or gap 4 is formed between the deflection disk and the insulation box. The deflection disk 2 and the insulation box 3 are held together by a triangular carrier 5, and are fastened to a heat-radiating object by corresponding fastening, by way of an inner ring 6 situated adjacent to the point of the V-shaped gap 4.

The fastening devices are illustrated schematically in FIG. 1 by a screw. In the embodiments described here and in the following, the heat-radiating object represents a rocket engine, with the lower part of the object 7a being the expansion nozzle of the engine, which heats up considerably during the operation of the rocket engine. To protect the thrust chamber 7b (see FIG. 6a) situated above the nozzle expansion 7a, the heat shield is arranged between the thrust chamber and the nozzle expansion, and extends in the radial direction to the outside.

The radiative heat flow, which is generated by the nozzle expansion 7a is partially reflected in the downward direction by the front 2a of the deflection disk 2. As is outlined in FIG. 1 by means of V-shaped arrows P1. Here, the deflection disk consists of a material of low emissivity; that is, only a small portion of the arriving heat radiation is emitted again by the material in the form of heat radiation. Particularly a coated metal plate can be used for the deflection disk, the plate being provided with a chemically inert coating, for example, with an electroplated gold coating, on the front side 2a as well as also on its back side 2b.

Heat radiation absorbed by the deflection disk 2 is transported to the back side 2b of the deflection disk and is then emitted into the V-shaped gap 4. In the V-shaped gap, a reflection of the heat radiation then takes place between the back 2b of the deflection disk 2 and the front 3a of the insulation box 3. Because of the V-shape of the gap, the heat radiation is transported toward the outside away from the rocket engine 7. For effective reflection, the front side 3a of the insulation box also is made of a material with low emissivity, particularly a metal sheet, which preferably is also provided with a chemically inert coating, for example, with an electroplated gold coating. The dissipation of the heat flow by multiple reflections at the walls 2b and 3a is indicated in FIG. 1 by a plurality of arrows P2.

The heat flow, which is not reflected at the walls 2b and 3a respectively, is taken up by way of the insulation box 3. For this purpose, the insulation box has an insulation layer 3b which is arranged above the front side 3a and preferably consists of a heat insulation mat. The heat insulation mat is covered by a metal cover sheet on the back side 3c of the insulation box. The heat flow entering into the insulation layer is outlined by arrows P3 in FIG. 1. Because of the low heat conduction of the insulation layer 3b, a temperature gradient is created toward the back side of the heat shield. It is thereby achieved that a low wall temperature exists at the back side of the heat shield and a very small portion of the radiation heat therefore arrives at the engine components of the thrust chamber to be protected.

By using chemically inert coatings for the front and back side of the deflection disk and, as required, also for the front side 3a of the insulation box, a chemical inertia is achieved in that oxidation is prevented and a possible deterioration of the emissivity at high wall temperatures is thereby counteracted. Instead of using the above-mentioned electroplated gold layer as the coating, it is also possible to use other noble metals or chemically stable, reflecting compounds as coating material or to use a surface which inherently has very good reflecting characteristics.

Figure 2:
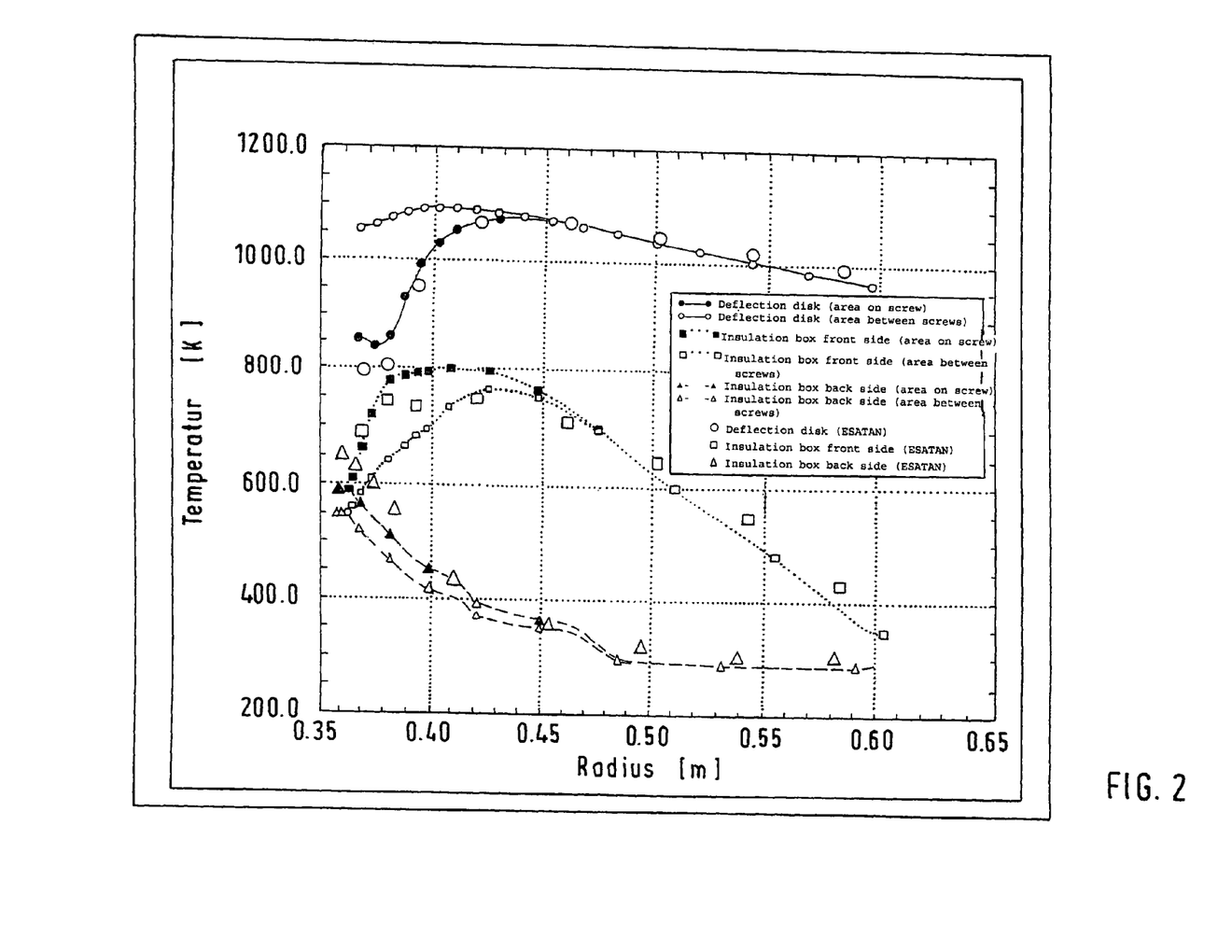
FIG. 2 is a diagrammatic view of the temperature distribution in the heat shield according to the invention.

FIG. 2 is a diagrammatic representation computed temperature distributions on the surfaces of a heat shield according to the invention for a rocket engine as a radial sectional view. The radius is entered on the abscissa in meters and the calculated temperature is entered on the ordinate. The calculation was carried out with a worst-case assumption for the emissivity of the planar elements for the radiation model used for the calculation and the operational load point of the engine. The graphs with the circular points relate to the temperature distribution of the deflection disk in an area on a fastening screw by means of which the heat shield is fastened to the heat-radiating object, as well as in an area between two fastening screws. Furthermore, the temperature distribution of the insulation box (graphs with triangular or square points) was checked on the front and back side as well as in an area between two fastening screws and in an area at one fastening screw. Here, the thermal analysis software TMG (the top six lines in the legend of the diagram and the analysis software ESATAN (the last three lines in the legend of the diagram) were used. The temperature of the planar elements was calculated in the simulation after 770 seconds.

It was found that the deflection disk reaches maximal temperatures of up to 1,100 K. The front side of the insulation box is heated up to 800 K. These surface temperatures result in a considerable radiation fraction which is radiated from the V-shaped gap of FIG. 1 sideways to the outside. The effect of the heat insulation by the insulation material 3b in the insulation box 3 is visible in the temperature course of the back side of the insulation box (diagrams with triangular points in FIG. 2). It is illustrated that the temperature on the back side drops from 600 K at a radial value of approximately 0.35 m to 300 K toward the outside. The high value of 0.35 m is the result of the direct heat conduction by the flange-type fastening by way of the inner ring 6 of FIG. 1.

Figure 3:
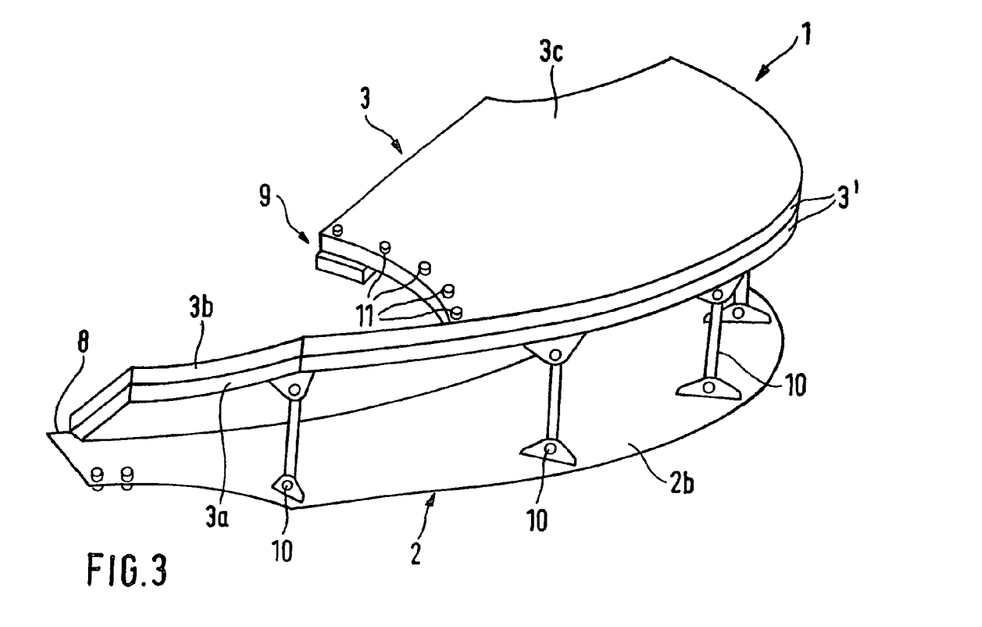
FIG. 3 is a perspective top view of a first embodiment of the heat shield according to the invention.

FIG. 3 is a perspective top view which shows a 120°-segment of a first embodiment of the heat shield according to the invention. The heat shield in this embodiment consists of a total of three of such segments which are assembled to form a ring and are connected with one another by means of corresponding connection elements 8.

FIG. 3 shows a disk-shaped construction of the deflection disk 2 as well as the construction of the insulation box 3 as parts of a cone. On the interior side of the heat shield, a flange 9 is provided which is even more clearly illustrated in FIG. 4 described below. A plurality of holding elements 10 are situated between the back side 2b of the deflection disk 2 and the front side 3a of the insulation box 3. These holding elements consist of sheet metal strips 10a which are disposed at corresponding projections 10b on the deflection disk, or 10c on the front side of the insulation box (see FIG. 5). The holding elements are used to hold the deflection disk, which, for the purpose of a simple manufacturing and mountability, is constructed as a flat disk and therefore has a low stiffness. The holding elements are disposed without radially stiff gripping, and the metal sheets of the deflection disk and the front side of the insulation box can thermally expand in the radial direction. The front side 3a and the back side 3c of the insulation box have overlapping rims 3' at the end away from the heat-radiating object. These rims are not connected with one another in order to avoid impairing the differing thermal expansions of the materials of the front and back side.

Because of the high material temperatures which occur, and the specific demands, metallic materials were used for the deflection disk as well as the front and back side of the insulation box. The high temperatures cause thermal expansions of different degrees in the metal. Inconel 600 and Inconel 718 were therefore selected as the base materials, which have a high plastic expansion at high temperatures. Because of the relatively low temperature, VA steel can be used as the material for the back side 3c of the insulation box.

Figure 4:
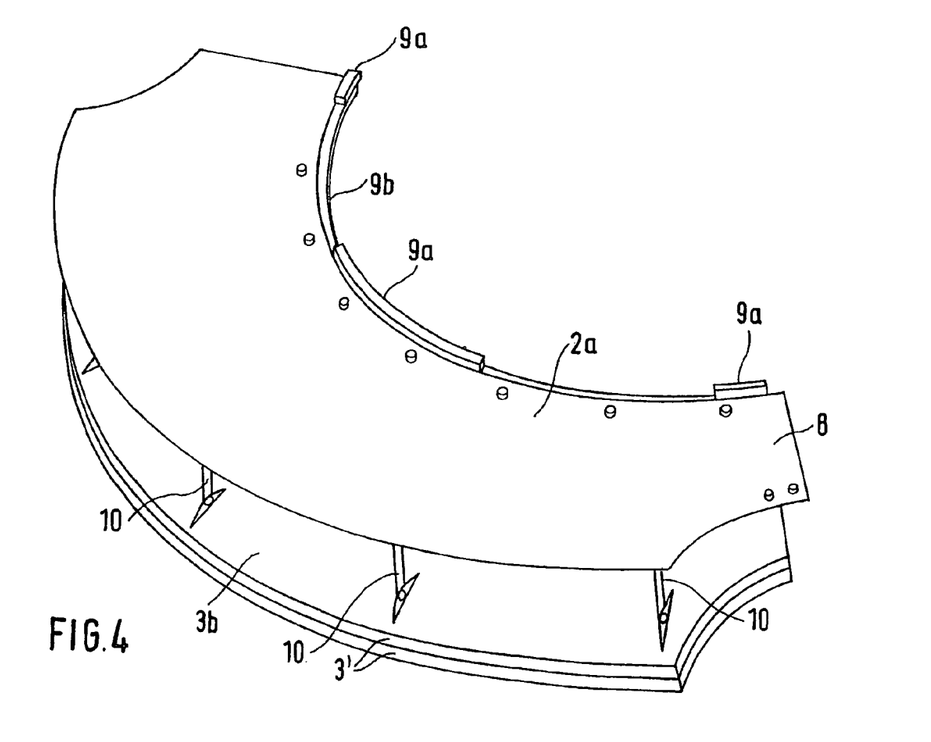
FIG. 4 is a perspective bottom view of the first embodiment of the heat shield according to the invention.

FIG. 4 is a perspective bottom view of the heat shield of FIG. 3, which shows the further development of the flange 9.

This flange forms a ring-shaped section with projections 9a and recesses 9b situated in-between. By way of the projections 9a, the heat shield is screwed to a rocket engine. The recesses 9b are used for the leading-through of measuring cables from the nozzle. Since the flange comes in contact with the heat-radiating object only at a few predetermined contact points 9a, the heat flow by heat conduction into the thrust chamber of the rocket engine to be protected from heat is minimized.

FIG. 5 again is a perspective, partially sectional view of the heat shield according to FIGS. 3 and 4, which shows the cross-sectional shape of the flange 9. It is illustrated that the flange 9 has bores 9c for fastening the heat shield by means of screws on the rocket engine. Furthermore, the flange comprises a projection 9d extending perpendicularly to the outside and having a slightly upward-bent end 9e. The front side 3a of the insulation box is welded and/or riveted on along the bent end 9e. In contrast, the back side 3c of the insulation box is fixedly screwed by means of the screws 11 to another projection 9f of the flange. Analogously, the deflection disk 2 is fastened to the flange 9 by means of screws 12 extending through bores in the deflection disk and the projection 9d. Here, the deflection disk does not rest directly on the projection 9d but is separated from the flange by way of a thin band of woven insulating mat, in order to avoid a heat transfer toward the flange.

Figure 5:
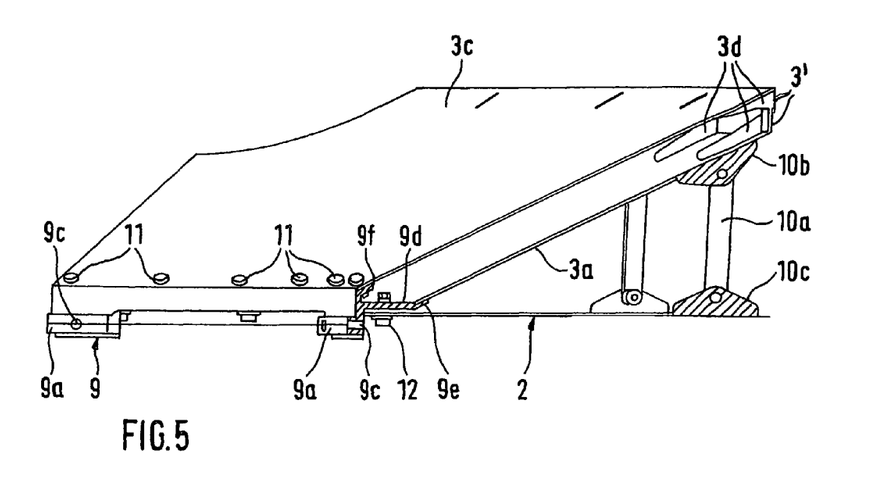
FIG. 5 is a partially sectional perspective view of a first embodiment of the heat shield according to the invention.

The insulating material between the front and back side of the insulation box was not shown in FIG. 5. The structures of the interior surfaces of the metal sheets 3a and 3c, which form the front and the back side, are therefore visible. In particular, it is illustrated that cradles 3d are provided in the interior at the rearward end of the metal sheets 3a and 3c, for guiding the metal sheets. In addition, FIG. 5 shows a cross-section of a holding element 10. It is illustrated that the sheet metal strip 10a of the holding element is disposed at its ends by way of projections 10b and 10c respectively on the insulation box and the deflection disk. The arrangement can be achieved, for example, by a screwed connection between the sheet metal strip and the projection.

Figure 6A:
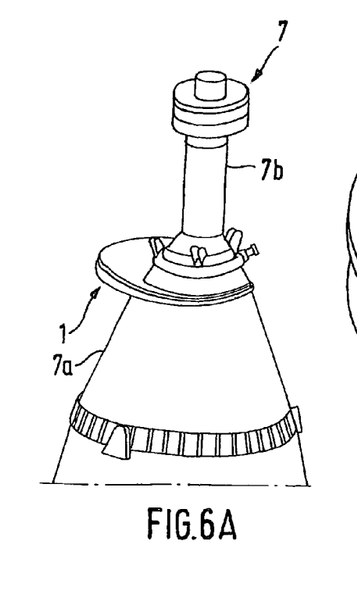
FIGS. 6A, 6B are two perspective views of a rocket engine to which the first embodiment of the heat shield according to the invention is fastened.
Figure 6B:
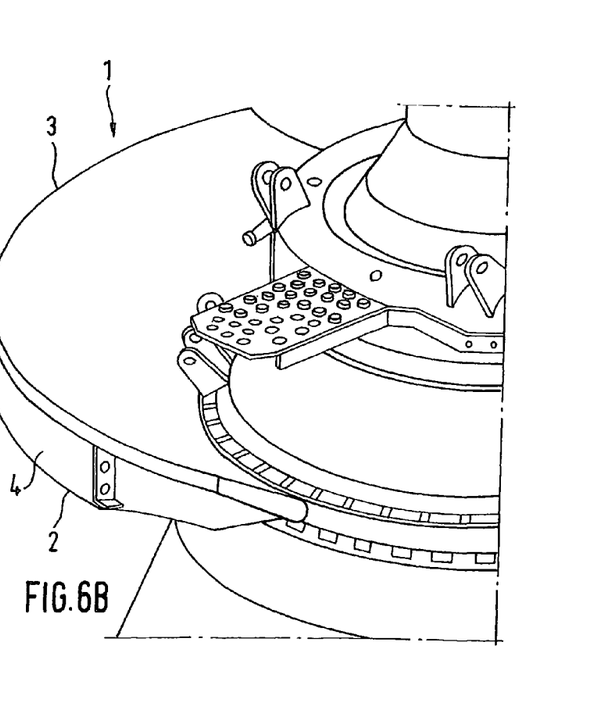

FIGS. 6A and 6B show the Vinci engine known from the state of the art, on which the heat shield according to the invention is fastened. FIG. 6B is an enlarged view of a cutout of FIG. 6A. The engine consists of the upper thrust chamber 7b, which is to be protected from the heat radiation of the intensively heating-up nozzle expansion 7a. For the purpose of a better view, only a single segment of the heat shield 1 is illustrated in FIGS. 6A and 6B. By way of the flange 9, this segment is fastened to a corresponding ring-shaped elevation between the thrust chamber 7b and the nozzle expansion 7a. The heat shield according to the invention thereby ensures a very good shut-off of the radiative heat flow of the nozzle expansion from the thrust chamber, by virtue of the deflection disk 2, among other things, which is situated directly adjacent to the nozzle expansion. This disk has a low emissivity and thereby already reflects a considerable fraction of the heat radiation. The remaining heat radiation is removed by way of the V-shaped gap by reflections between the deflection disk and the front side of the insulation box 3 toward the outside. The remaining heat is insulated by means of the insulation material in the insulation box and therefore also does not reach the thrust chamber 7b.

Figure 7:
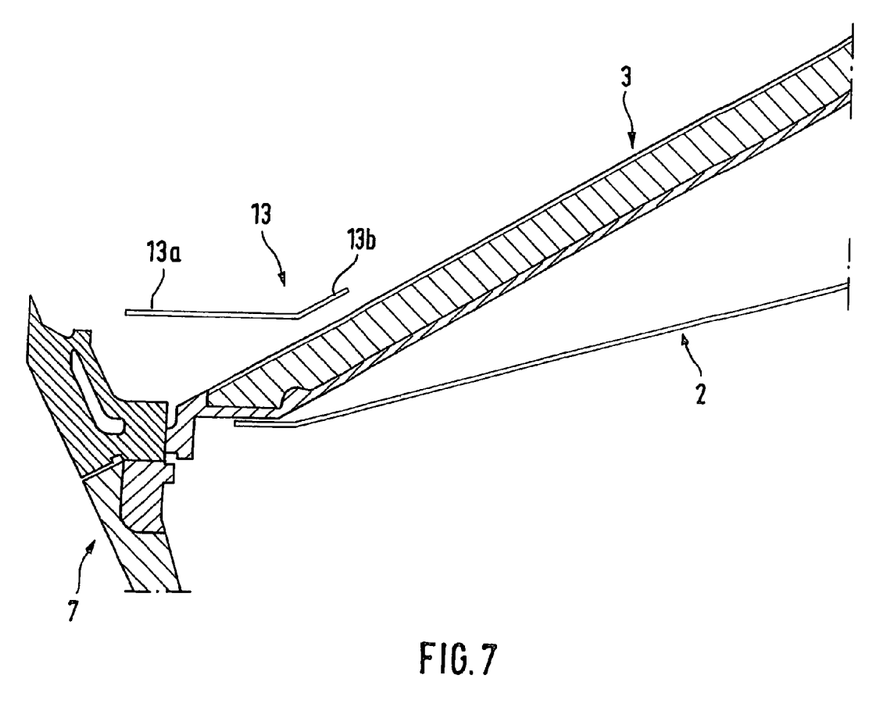
FIG. 7 is a schematic cross-sectional view of a second embodiment of the heat shield according to the invention.

FIG. 7 is a cross-sectional view of an alternative embodiment of the heat shield according to the invention, in which another small metal sheet 13 having a horizontally extending part 13 and a bend 13b is arranged above the insulation box 3. This creates another V-shaped gap between the metal sheet and the back side of the insulation box. In this manner, the maximum temperature on the back side of the heat shield can be further reduced.

A further concept, which is not illustrated in the figures, is the lowering of the surface temperature on the back side of the insulation box by insulation by means of a so-called multi-layer insulation (MLI). This concept functions well in a vacuum. For the use in rocket engines, metallic MLIs are particularly suitable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

LIST OF REFERENCE NUMBERS

1 Heat shield
2 first planar element
2a front side of first planar element
2b back side of first planar element
3 second planar element
3a front side of second planar element
3b insulation material
3c back side of second planar element
3d cradles
3' rims
4 gap
5 carrier
6 inner ring
7 rocket engine
7a nozzle expansion
7b thrust chamber
8 connection element
9 flange
9a projection
9b recess
9c bore
9d projection
9e bent end
9f projection
10 holding element
10a sheet metal strip
10b, 10c projections
11 screws
12 screws
13 metal sheet
13a vertical part
13b bend

What is claimed is:

1. A heat shield for mounting on a rocket engine having a thrust chamber and a nozzle expansion, said heat shield comprising:
    a first planar element having a front side and a back side, wherein in a mounted state of the heat shield, the first planar element extends from the rocket engine, with its front side being directly exposed to the heat radiation of at least a section of the rocket engine; and
    an insulating second planar element having a front side and a back side, the second planar element is arranged on the back side of the first planar element in such a manner that a gap is formed between the back side of the first planar element and the front side of the second planar element, wherein in the mounted state of the heat shield, the gap widens in an outward direction from the rocket engine, the heat shield is arranged between the thrust chamber and the nozzle expansion such that the front side of the first planar element adjoins the nozzle expansion, and the first planar element comprises a material of low emissivity with chemically inert coatings on the front and back sides such that the heat radiation absorbed by the first planar element is transported to the back side of the first planar element and emitted into the gap.

2. The heat shield according to claim 1, wherein the first planar element comprises a metallic material.

3. The heat shield according to claim 1, wherein the chemically inert coating comprises a gold coating.

4. The heat shield according to claim 1, wherein the first planar element is a substantially ring-shaped disk.

5. The heat shield according to claim 1, wherein insulation material is arranged between the front and back sides of the second element.

6. The heat shield according to claim 1, wherein at least one of the front and back sides of the second element comprises a metallic material.

7. The heat shield according to claim 1, wherein at least one of the front and back sides of the second element has a chemically inert coating.

8. The heat shield according to claim 7, wherein the chemically inert coating comprises gold.

9. The heat shield according to claim 1, wherein the second element forms a substantially ring-shaped part of a cone.

10. The heat shield according to claim 1, wherein the gap between the back side of the first planar element and the front side of the second element has a substantially V-shaped cross-section, the point of the V-shape adjoining the rocket engine.

11. The heat shield according to claim 1, wherein, in the mounted state of the heat shield, the gap between the back side the first planar element and the front side of the second is opened at its end situated away from the rocket engine.

12. The heat shield according to claim 1, wherein at least one holding element is arranged between the back side of the first planar element and the front side of the second element.

13. The heat shield according to claim 12, wherein the holding elements are fastened to the first and/or second planar element such that thermal expansion of the first and/or second element is permitted.

14. The heat shield according to claim 12, wherein the holding elements comprise strip-type elements.

15. The heat shield according to claim 1, wherein the heat shield comprises a flange element to which the first and second elements are fastened, and which is used for mounting the heat shield on the rocket engine.

16. The heat shield according to claim 15, wherein the flange element has an essentially ring-shaped construction.

17. The heat shield according to claim 15, wherein the first and second elements are fastened to the flange element by way of screwed and/or welded and/or riveted connections.

18. The heat shield according to claim 15, wherein:
    the flange element has a plurality of recesses, which separate contact surfaces of the flange element from one another; and
    in the mounted state of the heat shield, the contact surfaces rest against the rocket engine.

19. The heat shield according to claim 1, wherein the heat shield comprises a plurality of ring-shaped partial circle segments, which are mutually connected to form a closed ring.

20. The heat shield according to claim 1, wherein:
    a third element is arranged on the back side of the second planar element; and
    an additional gap is formed between the back side of the second planar element and the third element.

21. A rocket engine, comprising:
a thrust chamber for fuel combustion; and
a nozzle expansion for the exiting of the fuel, wherein a heat shield is arranged between the thrust chamber and the nozzle expansion such that the front side of the first planar element adjoins the nozzle expansion, the heat shield comprising
  a first planar element having a front side and a back side, wherein in a mounted state of the heat shield, the first planar element extends from the rocket engine, with its front side being directly exposed to the heat radiation of at least a section of the rocket engine; and
  an insulating second planar element having a front side and a back side, the second planar element is arranged on the back side of the first planar element in such a manner that a gap is formed between the back side of the first planar element and the front side of the second planar element,
wherein in the mounted state of the heat shield, the gap widens in an outward direction from the rocket engine, and wherein the first planar element comprises a material of low emissivity with chemically inert coatings on the front and back sides such that the heat radiation absorbed by the first planar element is transported to the back side of the first planar element and emitted into the gap.

* * * * *